(12) United States Patent
Lee et al.

(10) Patent No.: US 8,586,228 B2
(45) Date of Patent: Nov. 19, 2013

(54) BATTERY MODULE

(75) Inventors: Gun-Goo Lee, Suwon-si (KR);
Tae-Yong Kim, Suwon-si (KR);
Yoon-Cheol Jeon, Suwon-si (KR)

(73) Assignee: Samsung SDI Co., Ltd., Yongin (KR)

( * ) Notice: Subject to any disclaimer, the term of this patent is extended or adjusted under 35 U.S.C. 154(b) by 1873 days.

(21) Appl. No.: 11/493,749

(22) Filed: Jul. 26, 2006

(65) Prior Publication Data
US 2007/0026300 A1    Feb. 1, 2007

(30) Foreign Application Priority Data
Jul. 26, 2005  (KR) .................. 10-2005-0067773

(51) Int. Cl.
*H01M 10/50* (2006.01)

(52) U.S. Cl.
USPC .............. 429/120; 429/72; 429/156; 429/158

(58) Field of Classification Search
USPC ........................................................ 429/120
See application file for complete search history.

(56) References Cited

U.S. PATENT DOCUMENTS

| | | | |
|---|---|---|---|
| 5,456,994 A * | 10/1995 | Mita | 429/71 |
| 6,569,561 B1 * | 5/2003 | Kimura et al. | 429/159 |
| 8,003,245 B2 * | 8/2011 | Lee et al. | 429/149 |
| 2002/0182493 A1 | 12/2002 | Ovshinsky et al. | |

FOREIGN PATENT DOCUMENTS

| | | |
|---|---|---|
| DE | 19503085 A1 | 9/1996 |
| EP | 1091438 A2 | 4/2001 |
| EP | 1091438 A3 | 4/2001 |
| EP | 1139483 A1 | 10/2001 |
| EP | 1662602 A1 | 5/2006 |
| JP | 2004-158393 | 6/2004 |

OTHER PUBLICATIONS

EPO Communication dated Aug. 6, 2013 for corresponding EP Application No. 06 117 904.0—1360.

* cited by examiner

*Primary Examiner* — John S Maples
(74) *Attorney, Agent, or Firm* — Knobbe, Martens, Olson & Bear, LLP

(57) ABSTRACT

The present invention relates to a battery module including an aggregation comprising unit cells and a housing for housing the aggregation and circulating a coolant therein. The housing includes an inlet part disposed on an upper side of the aggregation, through which the coolant can flow into and along the housing in a length direction, and an outlet part connected to the inlet part, through which the coolant can be released out of the housing after cooling the unit cells while passing the aggregation.

20 Claims, 8 Drawing Sheets

BATTERY MODULE

CROSS-REFERENCE TO RELATED APPLICATION

This application claims priority to Korean patent application No. 10-2005-0067773 filed in the Korean Intellectual Property Office on Jul. 26, 2005, and all the benefits accruing therefrom under 35 U.S.C. §119. The contents of the Korean patent application are incorporated herein by reference in their entirety.

BACKGROUND OF THE INVENTION

1. Field of the invention

The present invention relates to a rechargeable battery. More particularly, the present invention relates to a battery module that improves cooling efficiency of unit cells.

2. Description of the Related Art

Unlike non-rechargeable batteries, rechargeable batteries may be repeatedly recharged. Low-capacity rechargeable batteries are used as a power source for various portable small electronic devices such as cellular phones, laptop computers, and camcorders. Large-capacity rechargeable batteries are used for motor-driven devices such as hybrid electric vehicles. Large-capacity rechargeable batteries can be formed by connecting multiple rechargeable batteries in series.

A typical battery module includes a plurality of rechargeable batteries, which are often referred to as unit cells (hereinafter "unit cells"). A unit cell includes an electrode assembly including positive and negative electrodes and a separator interposed therebetween, a case for housing the electrode assembly, a cap assembly combined with the case and sealing it, and positive and negative terminals electrically connected to the positive and negative electrodes, respectively.

The rechargeable batteries or unit cells are mainly formed in cylindrical or prismatic shape. When the unit cell is fabricated in a prismatic shape, the positive and negative terminals are mounted to externally protrude out of the cap assembly, so that they can be exposed outside the unit cell. When the unit cells forms a battery module, they are arranged such that the positive terminal of one unit cell is close to the negative terminals of an adjacent unit cell. Then, the positive and negative terminals are connected to each other through a conductor, which is fixed or fastened to the positive and negative terminals with nuts or other mechanisms.

A battery module is formed of several to tens of unit cells. The battery module is equipped with a cooling structure or mechanism for dissipating the heat generated from the unit cells and a circuit system for electrically controlling the unit cells. Furthermore, when the battery module is applied to a motor-driven device such as an electric cleaner, an electric scooter, or an automobile (an electric vehicle or a hybrid electric automobile), it needs many unit cells. The unit cells are usually arranged in a stacked structure, causing the battery module to have a large volume.

Therefore, it is difficult to down-size battery modules and an electrical device with such a large battery module. It is also difficult to evenly cool all the unit cells. In a typical battery device, a coolant circulates within a housing enclosing the aggregated unit cells. However, cooling may not be sufficient or effective to cool each unit cell evenly. When unit cells in a battery module are not evenly cooled, the performance of the battery module may deteriorate.

Furthermore, insufficiently cooled unit cells release heat, which may increase the temperature of the battery module and thereby may further deteriorate performance of the battery module. Particularly, this problem can be more serious in a battery module requiring high power.

The above information disclosed in this background section is only for the understanding of the background of the invention, and no statement in this section constitutes an admission of prior art.

SUMMARY OF CERTAIN INVENTIVE ASPECTS

One aspect of the invention provides a battery module. The battery module comprises: a stack of a plurality of unit cells and a plurality of cell barriers, each cell barrier being interposed between two adjacent unit cells; a housing enclosing the stack; an inlet formed on an upper side of the stack in the housing and configured to receive a coolant into the housing; and an outlet formed in the housing and configured to discharge the coolant from the housing.

In the foregoing battery module, the battery module may further comprise another stack enclosed in the housing, wherein the stacks may be separated from each other within the housing. The stacks may be disposed on substantially the same plane. The plurality of unit cells may comprise a first unit cell and a second unit cell, and the plurality of cell barriers may comprise a first cell barrier interposed between the first and second unit cells. The first cell barrier may provide a coolant passage between the first and second unit cells. Each pair of adjacent unit cells may sandwich one of the plurality of cell barriers. The first cell barrier may comprise the coolant passage integrally formed therethrough. The coolant passage may comprise a plurality of through holes formed in the first cell barrier, and the plurality of through holes may be bent or straight. The plurality of through holes may comprise substantially straight portions. The stack may comprise a first surface and a second surface, wherein the coolant passage may have a first opening on the first surface and a second opening on the second surface, and wherein the housing may have a first space over or next to the first surface and a second space over or next to the second surface. The inlet may be configured to direct coolant to the first space, and wherein the outlet may be configured to draw coolant from the second space.

Still in the foregoing battery module, the body may comprise a lower part for housing the stack and an upper part connected with the lower part and comprising the inlet and outlet parts. The inlet and outlet may be located and configured to flow the coolant in substantially the same direction. The inlet and outlet may be located and configured to flow the coolant in substantially opposing directions. The first cell barrier may comprise a plate and protrusions from on a surface of the plate, wherein at least part of the protrusions contact the first unit cell, wherein the coolant passage may be formed in the space between the first cell barrier and the first unit cell. The protrusions may be regularly formed on the surface. The first cell barrier further may comprise a gap closure extending along an edge of the plate, wherein the gap closure substantially closes a gap that would otherwise exist between the first and second unit cells along the edge of the plate so as to substantially direct flow of the coolant toward other than the gap closure. The first cell barrier further may comprise one or more gap closures along edges of the plate such that the coolant passing the coolant passage may be directed to a desired direction. The first cell barrier does not comprise the gap closure along an edge close to the outlet. The plurality of unit cells may be prismatic.

Another aspect of the invention provides a method of cooling unit cells in a battery module. The method comprises:

providing the foregoing battery module; flowing a coolant into the housing via the inlet, wherein the coolant flowing into the housing passes through the coolant passage; and discharging the coolant from the housing via the outlet. In the method, flowing the coolant in a first direction at the inlet, wherein discharging the coolant in a second direction at the outlet, and wherein the first and second directions may be substantially the same. Still in the method, flowing the coolant in a first direction at the inlet, wherein discharging the coolant in a second direction at the outlet, and wherein the first and second directions may be substantially opposite.

Another method of cooling unit cells in a battery module comprises: providing the foregoing battery module; flowing a coolant into the first space of the housing via the inlet; flowing the coolant into the coolant passage via the first opening; discharging the coolant into the second space of the housing from the coolant passage via the second opening; and discharging the coolant from the second space via the outlet to outside the housing. Still another method comprises: providing the foregoing battery module; flowing a coolant into the housing via the inlet; flowing the coolant into the coolant passage; directing the coolant toward an edge of the plate other than the gap closure, thereby discharging the coolant from the coolant passage to an interior space of the housing; and discharging the coolant from the interior space via the outlet to outside the housing.

One embodiment of the present invention provides a battery module including an aggregation of unit cells and a housing for housing the aggregation, and circulating a coolant therein. The housing includes a body having an inlet part arranged at an upper side of the aggregation, so that the coolant can enter the housing through the inlet part and proceed along the housing in a length direction, and an outlet part connected with the inlet part and releasing the coolant that is warmed while passing the aggregation.

The aggregation may be formed as a pair, which may be arranged to be opposite to each other. A pair of the aggregations can be disposed on the same plane. Each aggregation may include a cell barrier interposed between the unit cells.

The cell barrier may include a passage through which the coolant can internally flow. The passage may be perpendicularly disposed inside the cell barrier. The body may include a lower part for housing the aggregation and an upper part that is combined with the lower part in an exchangeable manner and that forms the inlet and outlet parts. The inlet and outlet parts practically include an inlet and an outlet through which the coolant can flow in and out, respectively. The inlet and outlet may be disposed on the same side of the body. However, the inlet and outlet may alternatively be disposed on the opposite side of the body. The coolant may include air.

The cell barrier may include protrusions disposed in a plate or on the surface of a plate at predetermined intervals, thereby forming a passage for circulating the coolant. The cell barrier may additionally include a closing part disposed on the same plate with the same height as that of the protrusions, and the closing part may be disposed at one end of the plate. The unit cell may be prismatic. The battery module may be for driving a motor.

DETAILED DESCRIPTION OF CERTAIN INVENTIVE EMBODIMENTS

Various embodiments of the present invention now will be described more fully hereinafter with reference to the accompanying drawings. One of skill in the art will appreciate the below described embodiments may be modified in various ways without departing from the spirit or scope of the present invention.

A battery module using air as a coolant is illustrated as exemplary hereinafter. However, the coolant is not limited to air but can include cold water or other appropriate fluids.

Figure 1:
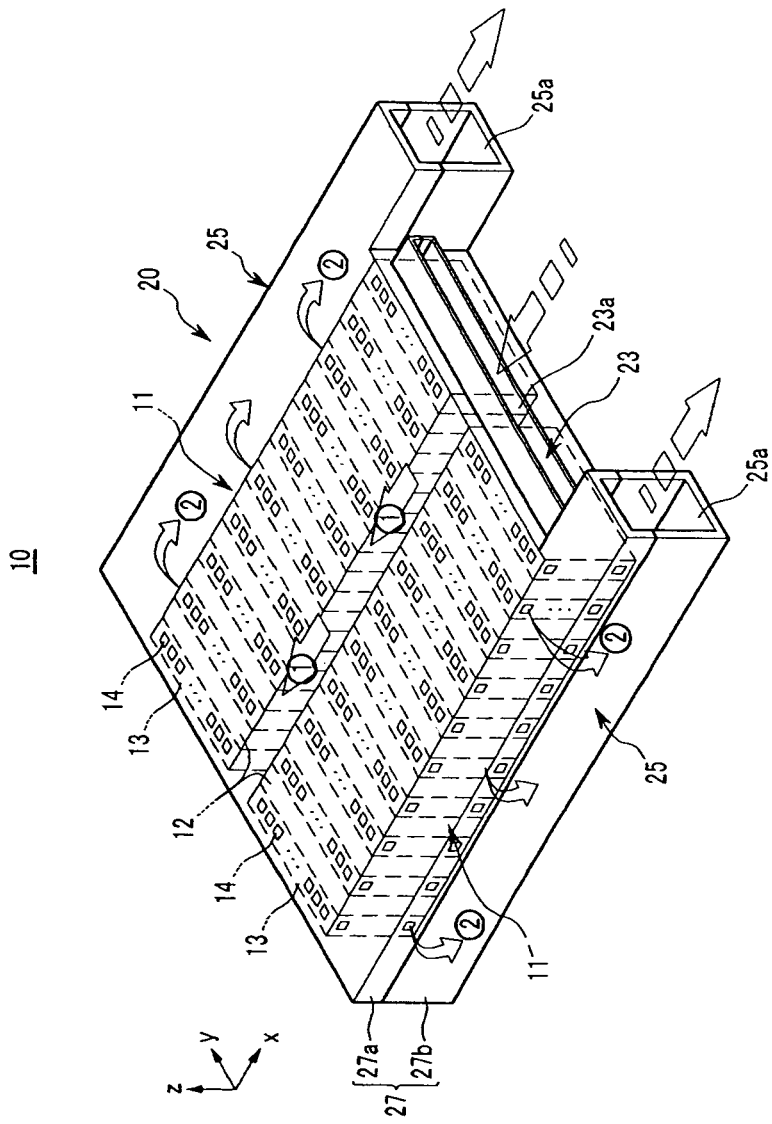
FIG. 1 is a schematic perspective view showing a battery module according to one embodiment of the present invention.

Referring to FIG. 1, the battery module 10 includes an aggregation or stack 11 of a plurality of unit cells 12 consecutively arranged at predetermined intervals. The battery module further includes a housing 20 for housing the aggregation 11 and circulating air therein for controlling temperature of the unit cells 12. The unit cell 12 is a common rechargeable battery including an electrode assembly, which includes positive and negative electrodes and a separator interposed therebetween, for charging and discharging electricity.

According to the embodiment of the present invention, the aggregation 11 is formed in a quadrilateral shape (here, a rectangle with a pair of long sides and a pair of short sides). In one embodiment, the housing 20 encloses a single aggregation 11 or a plurality of aggregations. According to the embodiment of the present invention, the aggregation 11 can be housed as a pair on the same plane in the housing, situated apart from each other. The disposition of an aggregation 11 as above can minimize the overall height of a battery module 10.

The aggregation 11 includes unit cells 12 and a cell barrier 13 disposed between two adjacent unit cells 12. The cell barrier 13 may also be located at one or both ends of the aggregation or stack 11. The cell barriers 13 play a role of supporting each unit cell 12 at their side, maintaining a distance between the unit cells 12. Importantly, the cell barriers 13 provide pathways of a coolant and allow cooling mechanism for every unit cell 12 in the stack or aggregation 11. Accordingly, each cell barrier 13 has passages 14 for circulating coolant air or other forms of coolant for controlling the temperature thereof.

Figure 2:
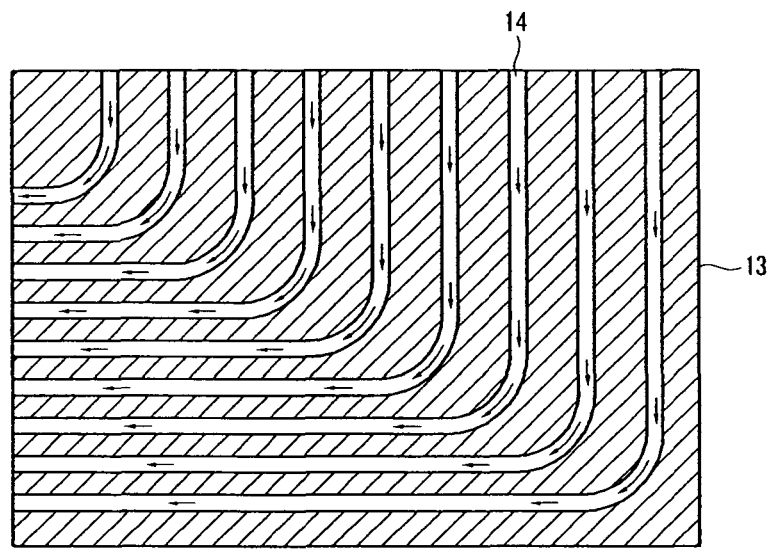
FIG. 2 is a cross-sectional view of a cell barrier located between two adjacent unit cells according to one embodiment and applicable to the battery module illustrated in FIG. 1.

According to embodiments of the present embodiment, the passages 14 are formed through the body of the cell barriers 13 as shown in FIG. 2. In other words, the passages 14 internally penetrate the cell barrier 13 from one side of to another side of the cell barriers 13. In the illustrated embodiment, the passages 14 in the cell barrier 13 extend vertically and turn horizontally. The configurations of the coolant passages 14 in the cell barriers 13 vary in different embodiments.

The housing 20 accommodates the aggregation 11 therein and also plays a role of cooling each unit cell 12 by circulating coolant air through the passage 14 in the cell barriers 13.

According to the illustrated embodiment of the present embodiment, the housing 20 includes a body 27 having an inlet 23 through which the coolant air can flow in and an outlet 25 through which the coolant air can be discharged.

The inlet 23 is located and configured to facilitate supplying of the coolant to the passage 14 which are to receive the coolant. In the illustrated embodiment, the inlet 23 is located at the upper side of the aggregation 11 so that coolant supplied into the housing can easily reach the openings of the passage 14 through which the coolant is to flow in. The outlet 25 is located and configured to facilitate discharging of the coolant discharged from the passage 14 to outside. In the illustrated embodiment, two outlets 25 are formed on the side surfaces of the aggregation 11 where openings of the passage 14 through which the coolant is to flow out. The inlet and outlet 23 and 25 include an inlet opening 23a and outlet openings 25a, respectively.

The body 27 of the housing 20 is divided into an upper body 27a and lower body 27b, which are separable from each other although not limited thereto. The body 27 has a space for housing an aggregation 11 therein. When multiple aggregations 11 are used, they are disposed apart from each other and fixed to the body 27. In the embodiment, two aggregations 11 are arranged in a longitudinal direction of the housing 20 (the X direction in FIG. 1).

Figure 3:
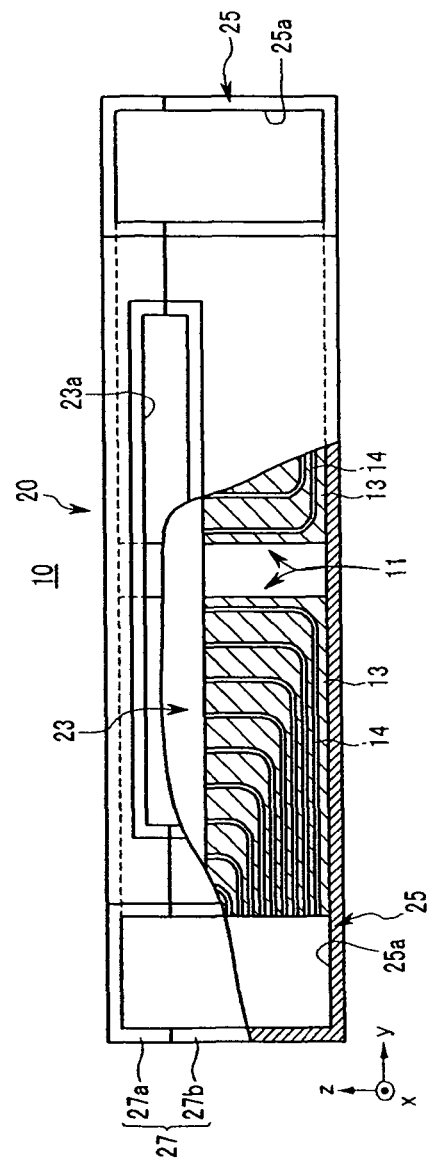
FIG. 3 is a front view showing the battery module illustrated in FIG. 1.

In the illustrated embodiment, the housing body 27 has a space at the upper side thereof, where the coolant entering into the body 27 can move. Since the inlet 23 is disposed above or at an upper side of each aggregation 11 in the housing body 27 (refer to FIG. 3), coolant air enters a housing 20 through the inlet opening 23a and primarily passes over the upper side of the aggregation 11.

In the illustrated embodiment, the outlets 25 are disposed at both sides of the inlet 23, and the body 27 has separate spaces for the outlet 25. The spaces are formed between internal walls of the housing 20, that is, at internal sides of the body 27, and the aggregation 11. In the illustrated embodiment, the outlets 25 are disposed substantially in parallel to the inflow of coolant air, which flows into a housing through the inlet 23.

Accordingly, coolant air enters the housing 20 through the inlet opening 23a of the inlet 23 passes through the passage 14 in the cell barriers 13, then flows in a direction substantially opposite to the inflow and is discharged out of the housing 20 through the outlet opening 25a of the outlet 25.

Hereinafter, operation of a battery module according to the illustrated embodiment of the present invention is illustrated in more detail. Coolant air enters the housing 20 through the inlet 23, and thereafter dispersedly flows into the passage 14 in the cell barrier 13 of the aggregation 11, while flowing along the upper side of the aggregation 11 (refer to arrow No. 1 in FIG. 1).

Subsequently, the coolant air passes through the passage 14, thereby cooling the unit cells 12 adjacent to the cell barrier 13, and then flows along the space formed within housing 20 (refer to arrow No. 2 in FIG. 1). It is then discharged out of the housing 20 through the outlet opening 25a of the outlet 25.

According to embodiments, the height of a battery module can be minimized by arranging two or more aggregations 11 parallel on an internal surface of the housing. This configuration will help efficient temperature control within the housing as the cooling can relatively evenly distributed to the barriers 13, comparing to configurations in which two or more aggregations are stacked in layers (not illustrated). However, even if two or more aggregations are stacked one over another, such configurations can still be benefited with the coolant passages 14 in cell barriers 13. Also, in some embodiments, two or more aggregations are arranged one over another with air passage in between them to improve the temperature control. The battery module 10 of various embodiments of the present invention can be effectively applied to electrical devices requiring high power and large capacity such as an electric vehicle, a cordless cleaner, a motorbike, an electric scooter, as well as a hybrid electric automobile.

Figure 4:
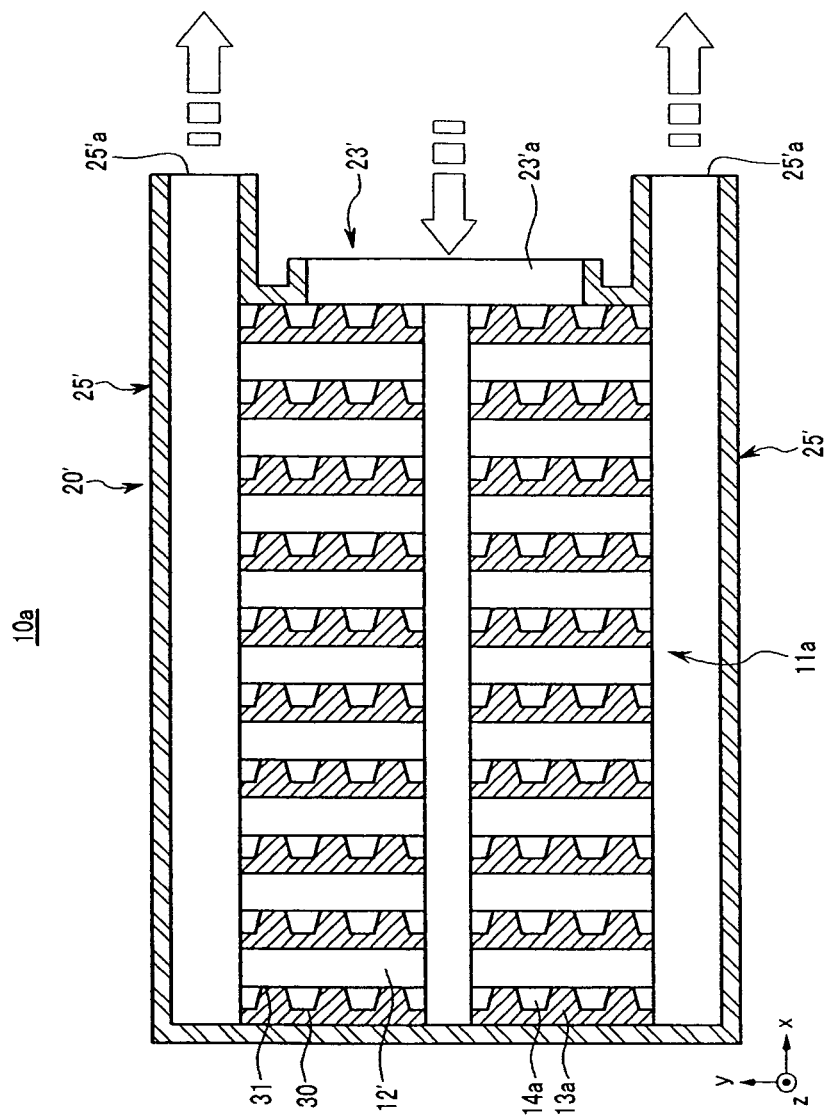
FIG. 4 is a schematic planar cross-sectional view illustrating a battery module according to another embodiment of the present invention.
Figure 5:
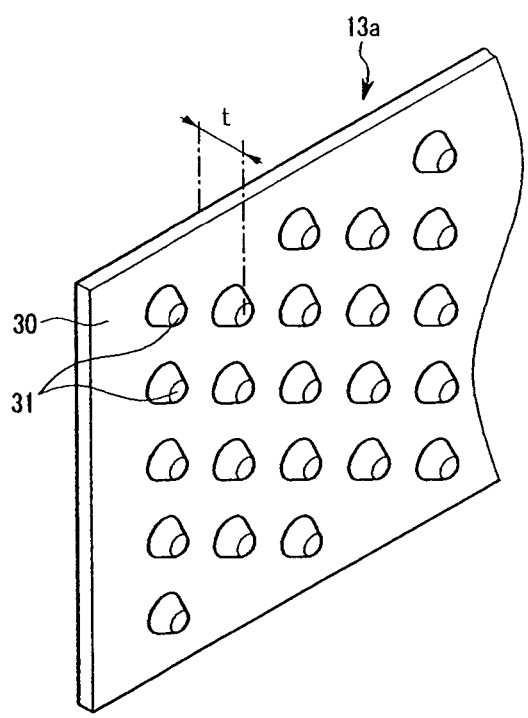
FIG. 5 is a perspective view of a cell barrier according to an embodiment and applicable to the battery module illustrated in FIG. 4.

FIG. 4 is a planar cross-sectional view of a battery module according to another embodiment of the present invention. FIG. 5 is a perspective view of a cell barrier that can be used with the battery module illustrated in FIG. 4. Referring to FIGS. 4 and 5, the battery module 10a includes a cell barrier 13a with a structure different from that of FIG. 2. The cell barrier 13a includes a plate 30 and a plurality of protrusions 31 formed on the plate 30. In the illustrated embodiment, the plate 30 of the cell barrier has about the same size as unit cells 12' in y direction in FIG. 4, although not limited thereto. The protrusions 31 are substantially regularly disposed on the plate 30 at predetermined intervals. In the illustrated embodiment, the protrusions 31 are formed as circular truncated cones, although not limited thereto. The cell barrier 13a has a thickness (t) as shown in FIG. 5, which corresponds to a gap between the unit cells 12'. The thickness can be adjusted to the design of a battery module.

When each cell barrier 13a is placed between two unit cells 12', the protrusions 31 abut against one of the unit cells 12' and create passages 14a for circulating coolant air between the protrusions 31. As described with respect to the previous embodiment, coolant air is supplied from the upper side of an aggregation 11a, passes through the passage 14a of the cell barrier 13a, and is released through an outlet 25'. More specifically, coolant air enters the housing 20' through an inlet opening 23'a toward the upper side of the aggregation 11a. The coolant flowing into the housing 20' in its longitudinal direction is dispersed or distributed into each cell barrier 13a, and then passes through the passages 14a in the cell barrier 13a and cool unit cells 12' in the aggregation 11a. Thereafter, the coolant air that passes through the passage 14a is released to the internal space of the housing 20' to the sides of the aggregation, and then is discharged through an outlet opening 25'a.

Figure 6:
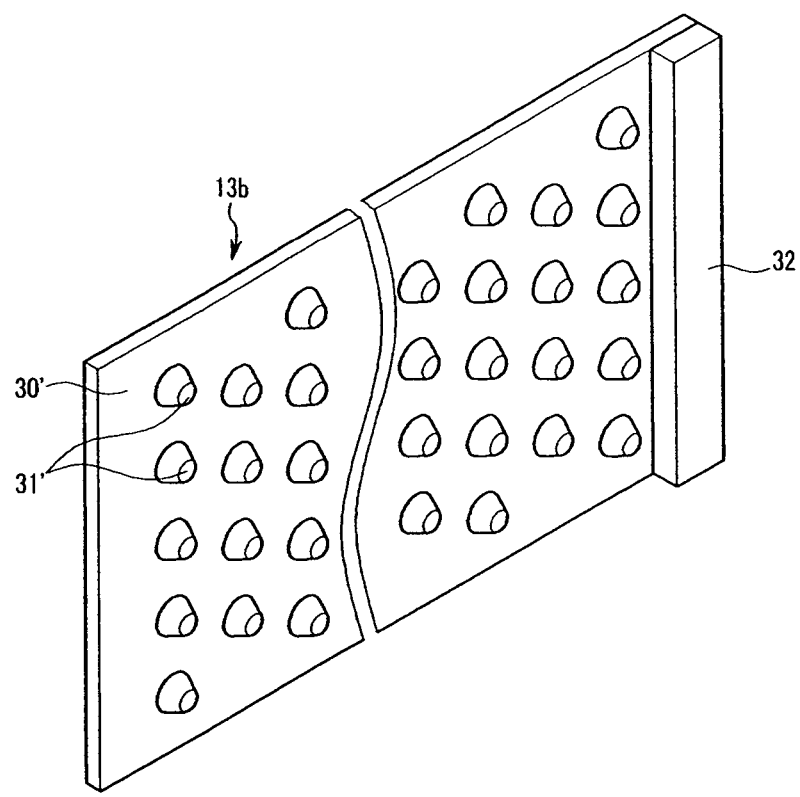
FIG. 6 is a perspective view of another cell barrier that can be applied to the battery module illustrated in FIG. 4.
Figure 7:
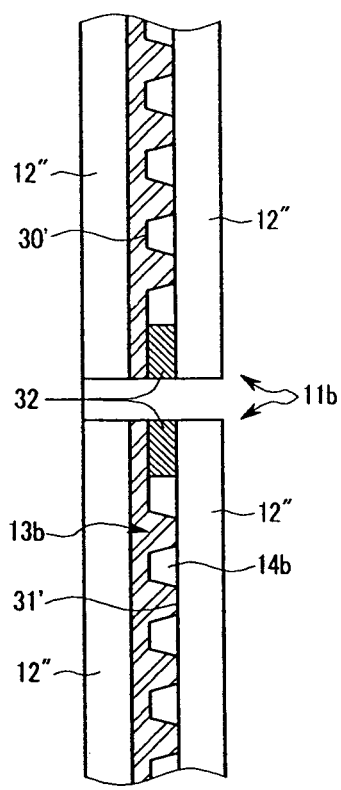
FIG. 7 is an enlarged view of a portion of the battery module including the cell barrier illustrated in FIG. 6.

FIG. 6 is a perspective view of another cell barrier 13b that can be used with the battery module illustrated in FIG. 4. The cell barrier 13b includes a plate 30' and protrusions 31' that are disposed thereon in one direction at predetermined intervals, similarly to FIG. 5. Furthermore, the plate 30' includes a closing part 32 with the same height as that of the protrusions 31'. As shown in FIG. 7, the closing part 32 is disposed between the aggregations 11b, when the cell barriers 13b are mounted with unit cells 12" to form the aggregations 11b. The closing part 32 blocks coolant air that has passed through the passages of one aggregation from flowing toward the neighboring aggregations 11b. This configuration improves circulation of the coolant air toward the outlet part and improves efficiency of the temperature control.

Figure 8:
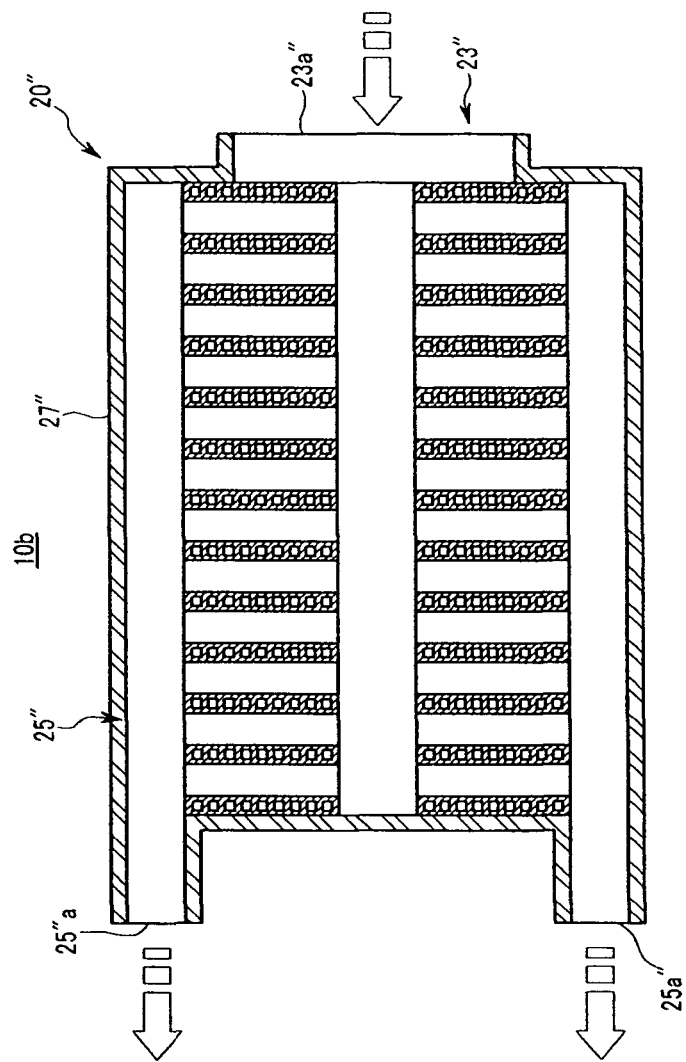
FIG. 8 is a planar cross-sectional view of a battery module according to another embodiment of the present invention.

FIG. 8 is a schematic planar cross-sectional view of a battery module according to another embodiment of the present invention. The battery module 10b of FIG. 8 differs from the battery module in FIG. 1 in that the outlet openings 25"a are positioned on the side opposing the inlet opening 23"a. According to this embodiment, the flows of coolant air at the inlet 23"a and the outlet 25"a (refer to the arrow in FIG. 8) are generally in the same direction. In other embodiments (not illustrated), the inlet and outlet openings may be formed in locations different from the foregoing embodiments.

According to the embodiments of the present invention, unit cells are disposed in a reformed structure to comprise a battery module, and can thereby minimize the volume of the battery module. In addition, a battery module of the present invention can solve a local thermal imbalance, and thereby increase cooling efficiency by improving the circulation structure for coolant air in order to relatively evenly circulate the coolant air among unit cells.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery module comprising:
    a stack of a plurality of unit cells and a plurality of cell barriers, each cell barrier being interposed between two adjacent unit cells;
    a housing enclosing the stack having a first and second opposed end surfaces and a first and second opposed lateral surfaces;
    an inlet formed on an upper side of the stack in the housing on the first end surface and configured to receive a coolant into the housing wherein the inlet communicates with an inlet coolant passage defined by the housing that extends from the first end surface towards the second end surface; and
    an outlet formed in the housing adjacent the first end surface and configured to discharge the coolant from the housing wherein the outlet communicates to an outlet coolant path defined by the housing that extends from the second end surface towards the first end surface,
    wherein the plurality of unit cells comprises a first unit cell and a second unit cell, and the plurality of cell barriers comprises a first cell barrier interposed between the first and second unit cells, wherein the first cell barrier provides a coolant passage between the first and second unit cells and the coolant path extends towards the lateral surfaces of the housing and connects the inlet coolant path and the outlet coolant path, and each pair of adjacent unit cells sandwiches one of the plurality of cell barriers,
    wherein the first cell barrier comprises the coolant passage integrally formed therethrough, and
    wherein the first cell barrier comprises a first surface and a second surface, wherein the coolant passage has a first opening on the first surface and a second opening on the second surface, and wherein the housing has a first space over or next to the first surface and a second space over or next to the second surface.

2. The battery module of claim 1, further comprising another stack enclosed in the housing, wherein the stacks are separated from each other within the housing.

3. The battery module of claim 2, wherein the stacks are disposed on substantially the same plane.

4. The battery module of claim 1, wherein the coolant passage comprises a plurality of through holes formed in the first cell barrier, and the plurality of through holes are bent or straight.

5. The battery module of claim 4, wherein the plurality of through holes comprises substantially straight portions.

6. The battery module of claim 1, wherein the inlet is configured to direct coolant to the first space, and wherein the outlet is configured to draw coolant from the second space.

7. The battery module of claim 1, wherein the housing comprises a lower part for housing the stack and an upper part connected with the lower part and comprising the inlet and outlet parts.

8. The battery module of claim 1, wherein the inlet and outlet are located and configured to flow the coolant in substantially the same direction.

9. The battery module of claim 1, wherein the inlet and outlet are located and configured to flow the coolant in substantially opposing directions.

10. The battery module of claim 1, wherein the first cell barrier comprises a plate and protrusions from on a surface of the plate, wherein at least part of the protrusions contact the first unit cell, wherein the coolant passage is formed in the space between the first cell barrier and the first unit cell.

11. The battery module of claim 10, wherein the protrusions are regularly formed on the surface.

12. The battery module of claim 8, wherein the first cell barrier further comprises a gap closure extending along an edge of the plate, wherein the gap closure substantially closes a gap that would otherwise exist between the first and second unit cells along the edge of the plate so as to substantially direct flow of the coolant toward other than the gap closure.

13. The battery module of claim 12, wherein the first cell barrier further comprises one or more gap closures along edges of the plate such that the coolant passing the coolant passage is directed to a desired direction.

14. The battery module of claim 12, wherein the first cell barrier does not comprise the gap closure along an edge close to the outlet.

15. The battery module of claim 1, wherein the plurality of unit cells is prismatic.

16. A method of cooling unit cells in a battery module, the method comprising:
    providing the battery module of claim 1;
    flowing a coolant into the housing via the inlet, wherein the coolant flowing into the housing passes through the coolant passage; and
    discharging the coolant from the housing via the outlet.

17. The method of claim 16, wherein flowing the coolant in a first direction at the inlet, wherein discharging the coolant in a second direction at the outlet, and wherein the first and second directions are substantially the same.

18. The method of claim 16, wherein flowing the coolant in a first direction at the inlet, wherein discharging the coolant in a second direction at the outlet, and wherein the first and second directions are substantially opposite.

19. A method of cooling unit cells in a battery module, the method comprising:
    providing the battery module of claim 1;
    flowing a coolant into the first space of the housing via the inlet;
    flowing the coolant into the coolant passage via the first opening;
    discharging the coolant into the second space of the housing from the coolant passage via the second opening; and
    discharging the coolant from the second space via the outlet to outside the housing.

20. A method of cooling unit cells in a battery module, the method comprising:
    providing the battery module of claim 12;
    flowing a coolant into the housing via the inlet;
    flowing the coolant into the coolant passage;
    directing the coolant toward an edge of the plate other than the gap closure, thereby discharging the coolant from the coolant passage to an interior space of the housing; and discharging the coolant from the interior space via the outlet to outside the housing.

\* \* \* \* \*